United States Patent [19]

Slater et al.

[11] Patent Number: 5,517,564
[45] Date of Patent: May 14, 1996

[54] COMMUNICATION APPARATUS AND METHOD

[75] Inventors: Martin Slater, Suffolk; Gary Crook, Essex, both of England

[73] Assignee: British Telecommunications public limited company, London, England

[21] Appl. No.: 313,602

[22] Filed: Sep. 29, 1994

[30] Foreign Application Priority Data

Jul. 29, 1994 [EP] European Pat. Off. .............. 94305662

[51] Int. Cl.$^6$ ....................................... H04M 9/00
[52] U.S. Cl. ................... 379/229; 379/219; 379/207; 379/201
[58] Field of Search ...................... 379/229, 211, 379/212, 207, 201, 265, 266, 216, 209, 221

[56] References Cited

U.S. PATENT DOCUMENTS

| | | | |
|---|---|---|---|
| 4,293,735 | 10/1981 | Duret | 379/229 |
| 4,757,526 | 7/1988 | Foster et al. | 379/229 |
| 5,311,583 | 5/1994 | Friedes et al. | 379/209 |
| 5,319,640 | 6/1994 | Yamasaki et al. | 379/229 |
| 5,327,489 | 7/1994 | Anderson et al. | 379/207 |
| 5,359,649 | 10/1994 | Rosu et al. | 379/207 |
| 5,381,471 | 1/1995 | Balakrishnan et al. | 379/265 |

FOREIGN PATENT DOCUMENTS

0398183A3  11/1990  European Pat. Off.  ......... H04Q 3/62

WO93/15583  8/1993  WIPO ............... H04M 7/00

Primary Examiner—Jeffery A. Horsass
Assistant Examiner—Scott Wolinsky
Attorney, Agent, or Firm—Nixon & Vanderhye

[57] ABSTRACT

Method and apparatus are provided for transmitting calls generated by a first communication network over a second communication network to a third communication network wherein the first communication network operates in accordance with a first communication protocol which enables call services, the third communication network operates in accordance with a communication protocol which enables at least one of the call services enabled by the first communication protocol and the second communication network operates according to a second communication protocol different from the first. The apparatus includes elements to determine whether a call to be routed from the first communication network to the third communication network by means of the second communication network requires a call service to produce a data message compatible with the second communication protocol indicative of the required service and to transmit the call and data message over the second communication network to the third communication network, where the data message is read and an appropriate call service established to the third communication network. By producing a data message compatible with the second protocol to carry the call service information it is possible to establish a call service over a communications network even though that network does not explicitly support the call service.

8 Claims, 4 Drawing Sheets

Fig.3.
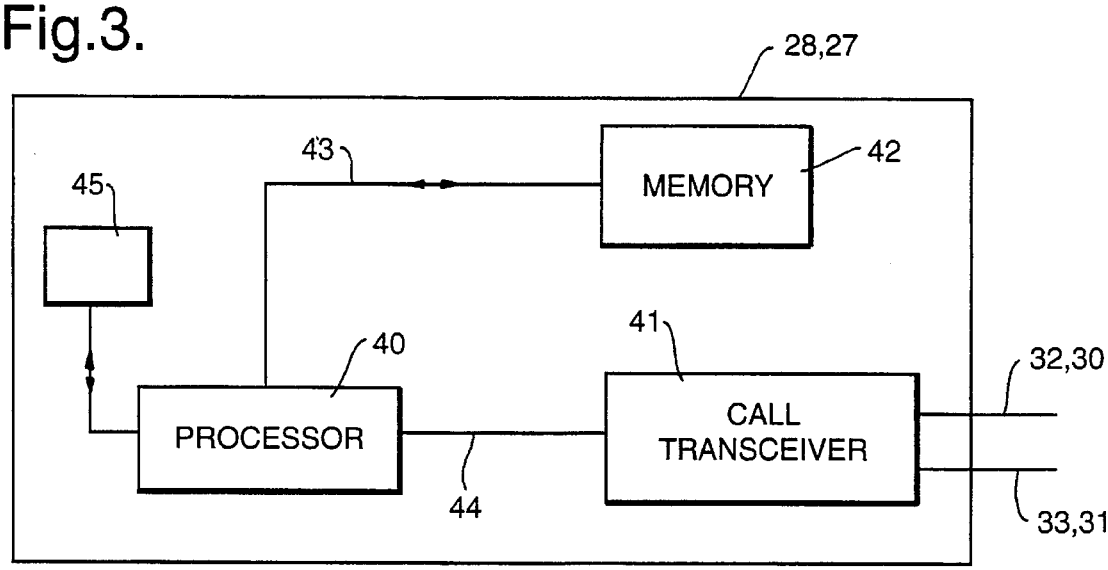
Fig.4.
| LEAD DIGIT(S) : | BEARER CALL NUMBER : |
|---|---|
| 9X | < NULL > |
| 22X | 0642 - 224694 |
| 33X | 0798 - 332040 |
| 34X | 0798 - 342041 |
| 44X | 0402 - 440103 |
Fig.5.
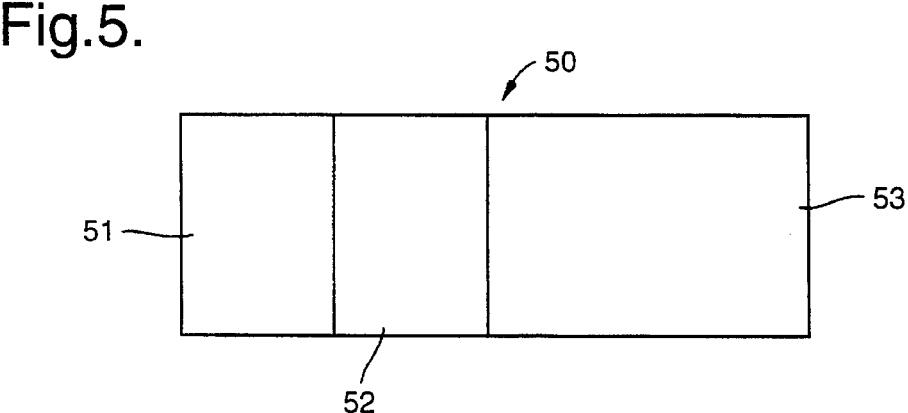

COMMUNICATION APPARATUS AND METHOD

FIELD OF THE INVENTION

This invention relates to a communication apparatus and a communication method. It is particularly applicable to the provision of call services over communication networks.

BACKGROUND OF THE INVENTION

In today's commerce, companies and organizations often have departments at widely separated geographical locations. Each geographical location is usually provided with a private branch exchange (PBX). The PBX connects telephones at that location to a number of outgoing lines connected to a public network or private circuit routes. The private circuit routes allow employees of the company to communicate with employees at other sites and to use call services as desired. It has been found desirable for personnel in the different departments to have available to them a range of call services on their telephone networks. These services may include "call-back-when-free", "call-back-when-next-used", "divert-on-busy" and "centralized-operator".

The call service "call-back-when-free" is a service which caters for the situation where a first telephone user wished to contact a second telephone user but is unable to do so because the second telephone user is engaged on another call. The first telephone user dials a code number for the "call-back-when-free" call service and replaces his handset. This causes his telephone to ring when the second telephone user finishes his present call and replaces his handset. By lifting his handset, the first telephone user can then cause the second user's telephone to ring and the call can then be made.

The call service "call-back-when-next-used" is a call service which caters for the situation where the first telephone user attempts to contact the second user but although a ringing tone is heard the second user does not answer the telephone. The first user then enters a code for this service and replaces his handset. This causes a "registration" of the request for call-back-when-next-used at the PBX serving the second user's telephone. The PBX monitors the second user's telephone for activity. When a call is made by the second user and then cleared from his telephone, the PBX notifies the PBX serving the first user's telephone. The PBX serving the first user's telephone then sets up a "no-ring" call which establishes a speech path between the two telephones. Only the first person's telephone is made to ring. When the first user answers his telephone, the second user's telephone is made to ring and the call is established.

The call service "divert-on-busy" caters for the situation where the first telephone user wishes to contact the second telephone user but that user is engaged. The second telephone user may have programmed his telephone system to divert calls to a colleague's extension when he is engaged on a call.

The call service "centralized-operator" allows one telephone extension of a local telephone network to act as the operator on behalf of other extensions of the entire private telephone network.

FIG. 1 shows a conventional communications network topology in which the network comprises four private branch exchanges 1 to 4, a public switched telephony network 5 and communication paths 6 to 12.

The private branch exchanges (PBX's) 1 to 4 serve local telephone networks at various sites of the same company. It will be readily appreciated from the figure that there are a number of possible routes for calls routed from one local telephone network to another along communication paths 6 to 12.

For example, suppose a call originating from a local telephone network served by PBX2 is to be routed to a local telephone network served by PBX3. It may be routed via communication path 8, the public switched network 5 and communication path 10 to arrive at PBX3. Alternatively, the call may be routed via communication path 9 to arrive at PBX3. This route is called a private circuit because it does not involve the call being carried over the public switched network 5.

In a similar manner, calls may be routed from PBX4 to PBX2 by means of communication path 11, the public switched network 5, and communication path 8. Alternatively, a private circuit may be used, comprising communication path 12, PBX3 and communication path 9, to arrive at PBX2.

Current PBX designs accept calls from an associated network of telephones at that site governed by a first communication protocol and pass that call to the public network by means of a second protocol. An example of the first protocol is digital private network signalling system (DPNSS) and an example of the second is digital access signalling system No2 (DASS2). DPNSS is a protocol which has been designed to support call services but the DASS2 protocol does not support call services.

Private circuit routes allow the PBX's to communicate using the first protocol DPNSS and hence allow supplementary; services. For geographically distant sites, it is usual for the organization to rent a dedicated communication path from a telephone service provider. In this case the dedicated communication path is path 9. However, generally speaking, these paths are often underutilized and this is especially the case for primary rate 2.048 Mbit/s paths. This results in the company or organization having to pay for dedicated communication paths which can carry a greater volume of call traffic than the company generates.

SUMMARY OF THE INVENTION

According to a first aspect of the invention there is provided apparatus for, in use, transmitting calls generated by a first communication network over a second communication network to a third communication network, the first communication network operating in accordance with a first communication protocol which enables call services, the third communication network operating in accordance with a communication protocol which enables at least one of the call services enabled by the first communication protocol and the second communication network operating according to a second communication protocol different to the first, which apparatus comprises means to determine whether a call to be routed from the first communication network to the third communication network by means of the second communication network requires a call service; means to produce a data message compatible with the second communication protocol indicative of the required service and means to transmit the call and data message over the second communication network to the third communication network, where the data message is read by an element of the third communication network and an appropriate call service established.

The invention thus enables the establishment of call services across a communication network that need not itself operate according to a communication protocol that provides call services. All that is required is that the protocol allows the transmission of data representing the service required which can then be read by an element of the destination network. Thus, it is not necessary for a dedicated communications network to be provided between two geographically remote sites of the same organization. A public switched network, for example, can be used to carry call service information in a transparent way. This is less expensive to the user than using private circuits.

Preferably, the apparatus includes means to receive data messages from the second communication network and to read the data messages to determine the required data service and to transmit a message to the first communication network according to the first protocol that enables the required service to be established.

The communication protocols may include DPNSS for the network protocol enabling call services and DASS2 for the protocol operating on the second network.

According to a second aspect of the invention there is provided a communications network comprising at least two local networks; a third network connected between the two local networks to allow routing of calls between at least two local networks operating in accordance with at least a first protocol enabling call services and the third network operating in accordance with a second protocol different from the or each first protocol; and means associated with each local network for routing calls originating on its associated local network over the third network to the another means for routing associated with the other local network, each routing means including means to determine from data on the local network whether a service call is required and to transmit over the third network a data message compatible with the second protocol containing data indicative of the required service and means to read such data messages to determine the required service call and to produce a data message on the associated local network according to the first protocol to establish the required call service.

Preferably, the first protocol is DPNSS and the second DASS1 or DASS2 with the message being transmitted over the network as a user to user message enabled by DASS1 or DASS2.

According to a further aspect of the invention there is provided a communication method comprising: receiving a call configured according to a first communications protocol, which call requires a call service; configuring one or more data messages including data representative of the call service compatible with a second protocol; transmitting the or each data message over a communications network operating according to the second protocol; receiving the or each data message after transmission over the communications network and establishing the required call service represented by the or each data message with a further communications network operating in accordance with a communications protocol which enables at least one of the call services enabled by the first communications protocol.

BRIEF DESCRIPTION OF THE DRAWINGS

A specific embodiment of the invention will now be described, by way of example only, with reference to the drawings in which.

FIG. 3 shows a Virtual Private Network Server in accordance with the invention;

FIG. 4 shows a memory structure stored in a memory of the VPN server shown in FIG. 3;

FIG. 5 shows a User to User Data Message (UUD) compatible with a protocol used in the communications network shown in FIG. 2.

DETAILED DESCRIPTION OF THE DRAWINGS

Figure 1:
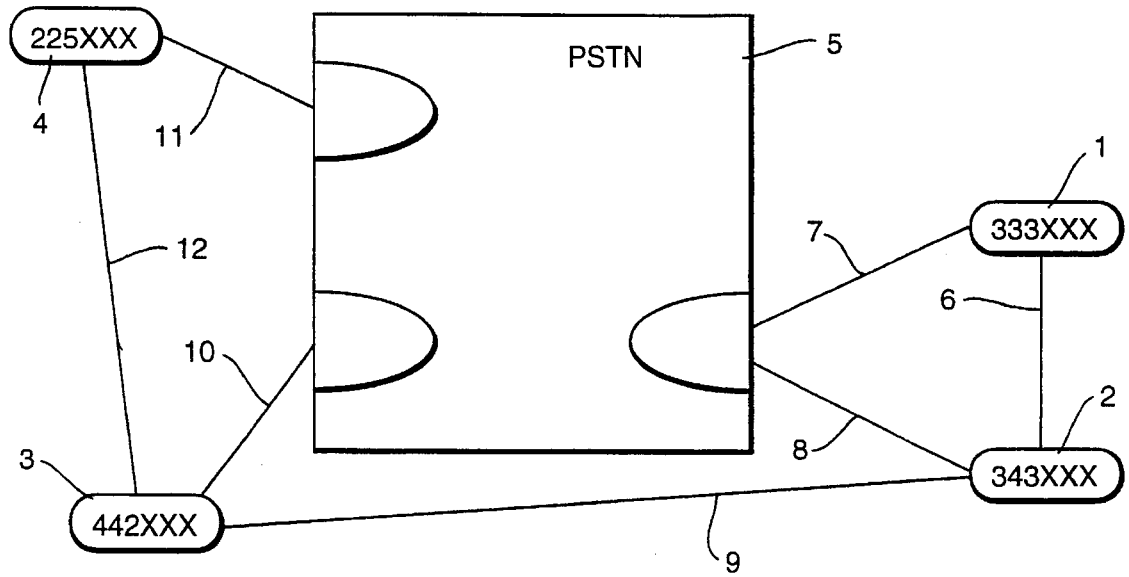
FIG. 1 shows in schematic form a prior art communications network of a number of private branch exchanges interlinked by dedicated lines and a public switched network.
Figure 2:
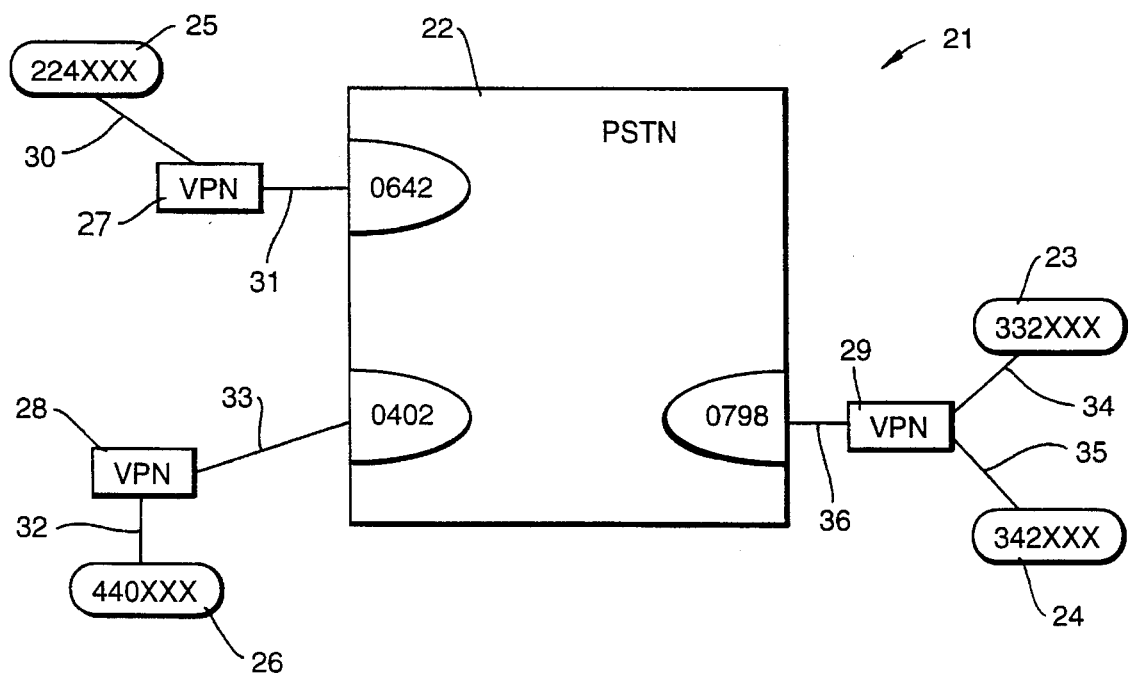
FIG. 2 shows in schematic form a communications network in accordance with the invention.

With reference to FIG. 2, a communication network 21 in accordance with the invention comprises a public switched telephony network 22, four PBX 23, 24, 25 and 26 each PBX serving an associated local network (not shown) and three virtual private network (VPN) servers VPN server 27, VPN server 28 and VPN server 29.

The communication network 21 also includes a number of communication paths. Communication path 30 links PBX25 to the VPN server 27 whilst communication path 31 links the VPN server 27 to the PSTN 22. Similarly, communication path 32 links PBX26 to VPN server 28 and communication path 33 links VPN server 28 to the PSTN 22. It will be seen from FIG. 2 that VPN server 29 is linked to two PBXs. Communication path 34 links the VPN server 29 to PBX 23 whilst communication path 35 links the VPN server 29 to PBX 24. A further communication path 36 links VPN server 29 to PSTN 22.

Each of the local networks includes equipment of a well known type such as telephones, facsimile machines, computers and computer modems and these will not be described in greater detail.

The communication paths comprise optical fibre but may comprise other communication cable.

The PBXs are Meridian 1 private branch exchanges, made by Northern Telecom, and available from British Telecommunications plc of 81 Newgate Street, London.

Each VPN server 27, 28, 29 is an intelligent switching unit capable of signalling protocol conversion and signalling protocol manipulation in a way which will be later described. The VPN servers 27 and 28 are nominally identical, the structure is as shown schematically in FIG. 3 and it comprises four major components, a processor 40, a call transceiver 41, a memory 42, and a processor instruction means 45.

For VPN server 28, the call transceiver 41 receives calls on communication path 32 originating from PBX 26 and on path 33 calls arriving by way of the PSTN 22. Calls are also redirected by the call transceiver 41 onto these paths under the control of the processor 40. Similarly, for VPN server 27 calls are received by its transceiver 41 on paths 30, 31 and calls can also be redirected onto these paths.

VPN server 29 differs from VPN servers 27,28 only in the connection of a further communication path, that is to say, communication paths 34, 35 and 36 are connected to its call transceiver 41.

The call transceiver 41 is connected to a processor 40 by a control and data bus 44. The processor 40 is able to interpret call information received by the call transceiver 41 and to instruct the call transceiver 41 to retransmit the call onto an appropriate one of the paths. The call information is passed by the call transceiver 41 along the control and data bus 44 to the processor 40. The same control and data bus 44 carries the instructions from the processor 40 to call transceiver 41.

The memory 42 stores a database of routing data and corresponding dialled digit strings arranged as a set of look-up tables. The processor 40 can access the data stored in the look-up table by means of data bus 43 in a way that will be later described. The processor instruction means 45 is a data storage area which stores the instructions which the processor 40 follows to perform the required operations. It takes the form of a ROM (read only memory), but it could take the form of a floppy disk, hard disk or other data storage device.

FIG. 4 shows a table 46 which is held in the memory 42 of each VPN server 27, 28 and 29. the table 46 comprises a first field 46a within which is stored lead digits of digit strings that may be dialled by a telephone user. The lead digits include "9", "22", "33", "34" and "44".

A second field 46b contains full bearer call numbers to be associated with the dialled lead digits. Lead digit "9" is associated with null bearer call number. Lead digits "22" are associated with bearer call number "0642-224694". Lead digits "33" are associated with a bearer call number "0798-332040". Lead digits "34" are associated with a bearer call "0798-332041". Lead digits "44" are associated with a bearer call "0402-440103".

Table 46 is configured as a look-up table such that inputting a lead digit or digits returns a bearer call number. Thus, if the lead digits "33" are input into the table 46 the bearer call number "0798-32040" is returned.

As can be seen from FIG. 2, numbers are allocated to parts of the communications network 21 as follows.

VPN server 27 is allocated the number "0642 224694" and PBX25 is allocated the number "224" the extensions supported by the PBX 25 being represented by "XXX" in the figure.

VPN server 28 is allocated the number "0402 440103" with the PBX it serves PBX 26 being allocated "440". Again, extensions being supported by the PBX are indicated as allocated to the number range "XXX".

VPN server 29 is allocated the numbers "0798 332040" and "0798 342041". The PBX 23 is allocated the number "332" with its extensions being allocated numbers in a range represented by "XXX" in the figure. The PBX 24 is allocated the number "342" with the extensions it supports being allocated numbers in a range represented in the figure by "XXX".

The local networks operate in accordance with a communications protocol called DPNSS-1 (digital private network signalling system). This protocol is well known to those skilled in the art of telecommunications and it enables a number of call services such as "call-back-when-free", "call-back-when-next-used", "divert-on-busy" and "centralized-operator".

The PSTN 22 operates in accordance with a communications protocol called DASS 2 (Digital Access Signalling System No.2). Again, this protocol is well known to those skilled in the art of telecommunications, but it is important to note that it does not support call services. It does, however, allow signalling between two PBX nodes in the form of user to user data messages.

The user to user data message has a format as shown in FIG. 5. It comprises a thirty two byte structure 50. A first one byte 51 is the MESSAGE_TYPE field of the message. It signifies whether the data message is complete or incomplete. This caters for the situation where a number of data messages are required to carry a particular set of data. A first to a penultimate data message will have a first byte 51 signifying the data message is incomplete and the last data message will have a first byte 51 signifying that the data message is complete. A second byte 52 signifies the length of the data carried in a data field 53. The data field 53 is allocated thirty bytes of the message.

Figure 6:
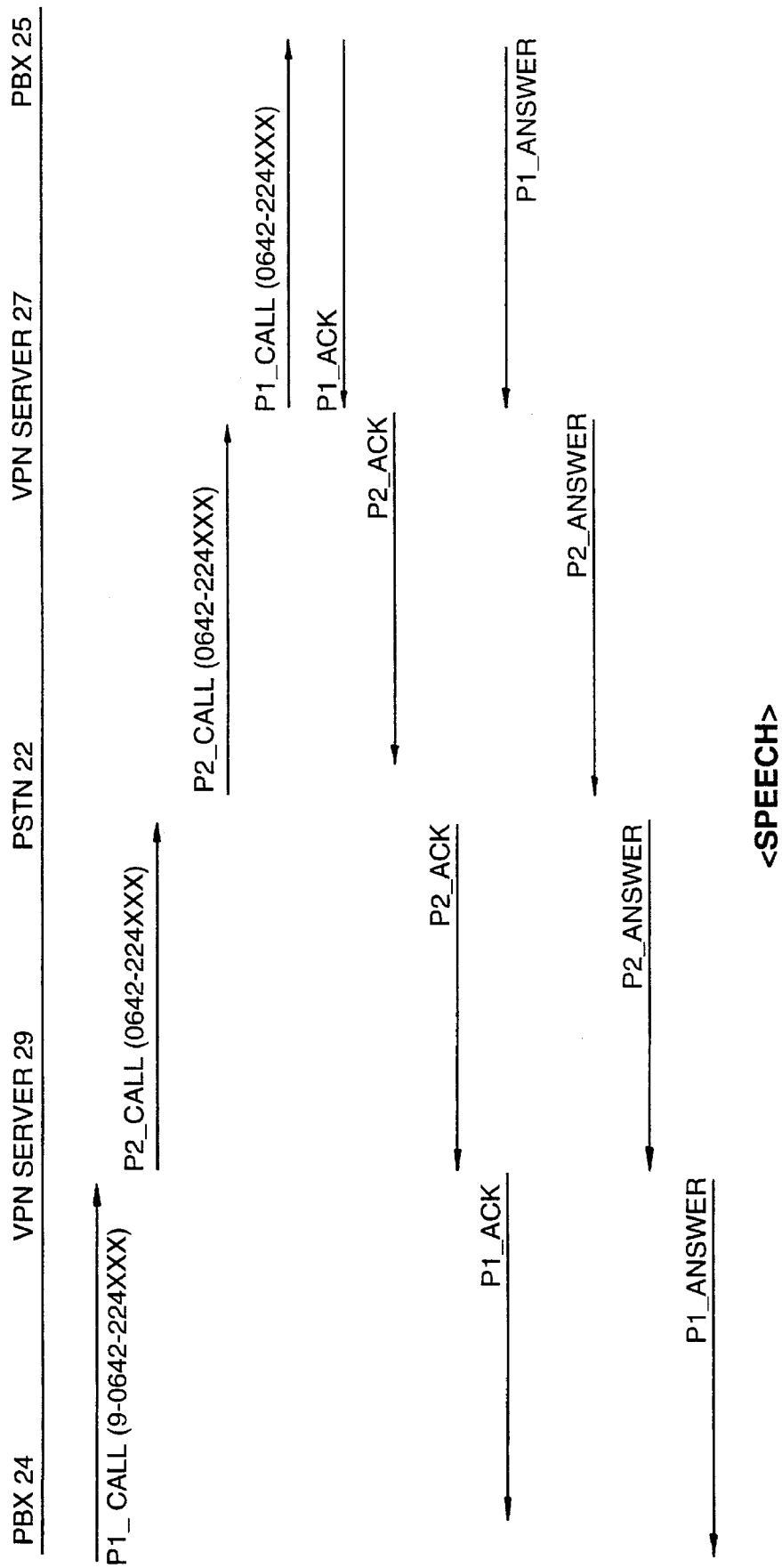
FIG. 6 and 7 are explanatory diagrams.

The communications network 21 operates in a manner as shown in FIG. 6 when a call is to be established between extensions served by different PBX's. In the figure a prefix P1 means that the message is configured according to the first protocol, DPNSS, and a prefix P2 means that the message is configured according to the second protocol DASS2.

Let us suppose that a first user is on an extension served by PBX 24 and wishes to call a second user on an extension served by PBX25. The first user dials a "9" for an outside line followed by "0642 224XXX" the PSTN number for a direct connection to the extension (direct in the sense that it does not go via a switchboard operator).

The dialling of a "9-0642 224XXX" results in a message P1_CALL (9-0642 224XXX) being sent to VPN server 29 from PBX 24. The VPN server 29 receives this along communication path 35. The call transceiver 41 passes the message to the processor 40. The processor 40 inputs the leading digit 9 into the look-up table 46 held in memory 42. The look-up table returns the bearer call number, which in this case is null. The processor 40 thus instructs the call transceiver 41 to suppress the leading digit "9" and a call message according to the DASS2 protocol, P2_CALL (0642 224XXX) is sent over the PSTN22, to VPN server 27. VPN server 27 converts this message to its equivalent in DPNSS P1_CALL (0642 224XXX).

PBX25 then sends an acknowledgement message P1_ACK to the VPN server 27. VPN server 27 transmits an acknowledge message P2_ACK over the PSTN22 to VPN server 29. VPN server 29 then sends a P1_ACK to PBX24.

PBX25 then sends a P1_ANSWER message which results in VPN server 27 sending a P2_ANSWER over PSTN22 to VPN server 29. VPN server 29 sends a P1_ANSWER message to PBX24.

Speech communication between the two extensions can then be initiated.

Figure 7:
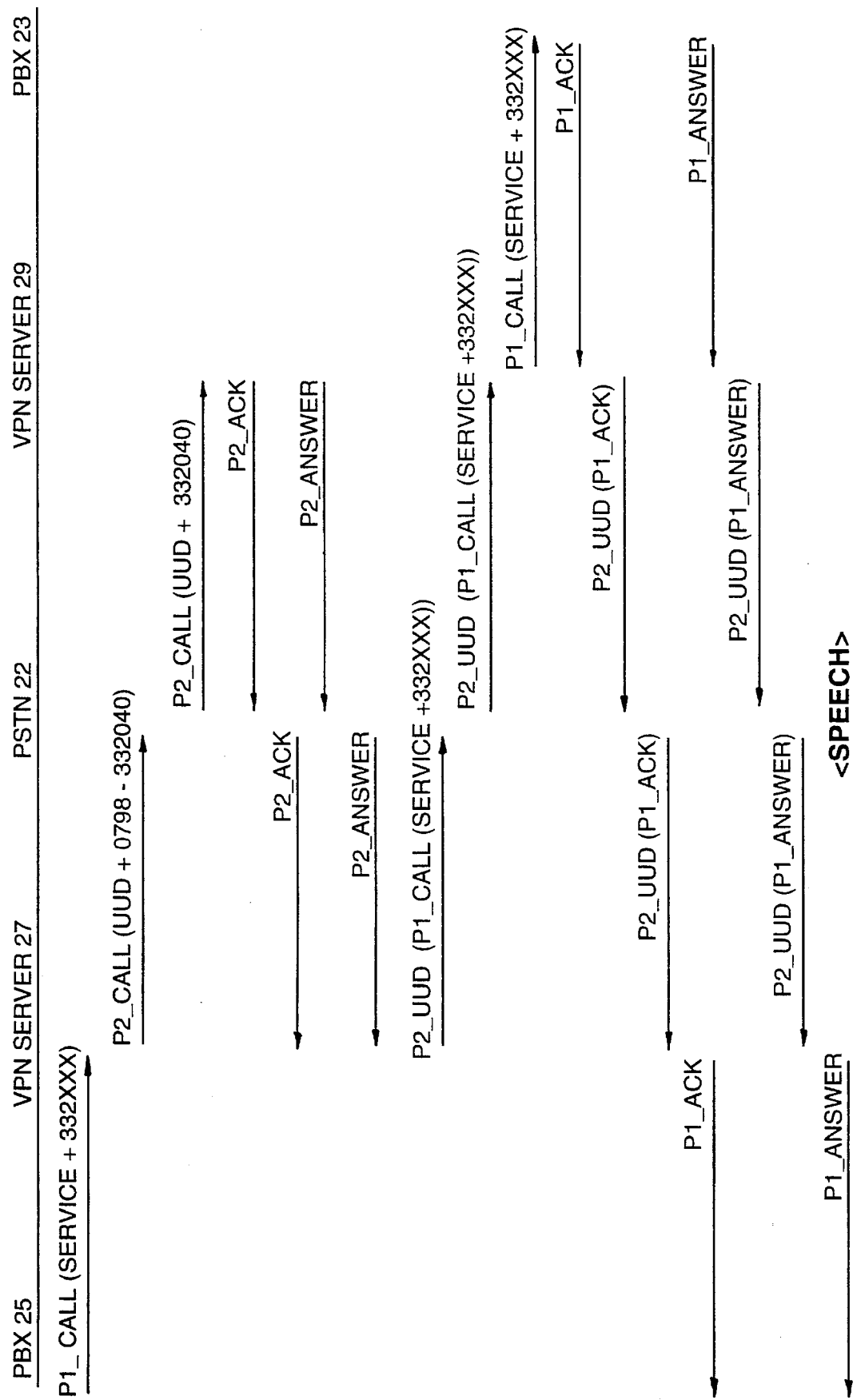

FIG. 7 shows the messaging sequence that occurs when a call service is to be utilised over the PSTN22 between extensions served by different PBXs. Suppose a call is to be made from a first extension served by PBX25 to second extension served by PBX23, and then is to utilise a call service. Again in this figure the prefix P1 is attached to a message which conforms to the protocol DPNSS and the prefix P2 is attached to a message which conform to the protocol DASS2.

To set up the call, the PBX25 receives a dialled digit string including a code for a call service from the first extension. PBX25 then sends a message to VPN server 27, P1_CALL (SERVICE +332XXX), 332XXX being the second extension served by PBX23. SERVICE being a code for the particular call service required.

VPN server 27 receives the message and inputs the first two digits "33" of the extension number into its look-up table 46. This returns the bearer call number 0798-332040. The processor 40 transmits from the call receiver 41 a message P2_CALL (UUD+0798-332040). The message is transmitted across the PSTN22 to VPN server 29. VPN server 29 sends an P2_ACK acknowledgement message across the PSTN22 to VPN server 27. This is followed by a P2_ANSWER message.

The VPN server 27 then sends the original call message P1_CALL (SERVICE+332XXX) in a UUD in the DASS2 protocol. This is shown in FIG. 7 as the message P2_UUD (P1_CALL(SERVICE+332XXX)). This travels across the PSTN22 to the VPN server 29 in a "transparent" way that is to say no number translation or protocol conversion is carried out but rather the original message is carried within the DASS2 compatible UUD.

The processor 40 of VPN server 29 then removes from the UUD, the DPNSS message P1_CALL (SERVICE+ 332XXX). It then transmits the message to PBX23. Thus it will now be seen that to PBX23 it appears that it has received the message directly from PBX25 that is to say it is a DPNSS call.

PBX23 then returns an acknowledgement message P1_ACK followed by P1_ANSWER. These are loaded by the VPN server 29 into UUDs P2_UUD (P1_ACK) and P2_UUD (P1_ANSWER) and they are sent over the PSTN22 to VPN server 27. VPN server 27 then removes the DPNSS messages and sends them to PBX25. Speech can then be initiated.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An apparatus for transmitting calls generated by a first communication network over a second communication network to a third communication network, wherein the first communication network operates in accordance with a first communication protocol which enables call services, the third communication network operates in accordance with a communication protocol which enables at least one of the call services enabled by the first communication protocol and the second communication network operates according to a second communication protocol different to the first, said apparatus comprises means connected to the first communication network for determining whether a call to be routed from the first communication network to the third communication network via the second communication network includes a call service; means responsive to the means for determining to produce a data message compatible with the second communication protocol, said data message being indicative of the required service and means connected to said first and second communication networks to transmit the call and data message over the second communication network to the third communication network, wherein the data message is read by an element of the third communication network and an appropriate call service established.

2. The apparatus as claimed in claim 1 wherein the call includes a dialled digit string, indicative of an element of the third communication network with which it is desired to establish a connection, transmitted by the means to transmit in the form of a data message compatible with the second communication protocol.

3. The apparatus as claimed in claim 1 further comprising a look-up table containing data for enabling connection to elements of the third communication network and corresponding dialled digits arranged such that by inputting a dialled digit to the look-up table results in the return from the look-up table of data enabling connection to a corresponding element.

4. A communications network comprising at least a first and a second apparatus as claimed in claim 1, a first communication network; a second communication network connected to said first communication network and to a third communication network; the first communication network operating in accordance with a first communication protocol which enables call services, the third communication network operating in accordance with a communication protocol which enables at least one of the call services enabled by the first communication protocol, and the second communication protocol, and the second communication network operating according to the second communication protocol which is different from the first, wherein the first apparatus connected to the first communication network routes calls originating from the first communication network over the second communication network to the second apparatus which is connected to the second communication network and the second apparatus accepts said calls and routes them to an appropriate element of the third communication network.

5. A communications network comprising at least two local networks; a third network connected between the local networks for routing of calls between the local networks, the local networks operating in accordance with a first protocol enabling call services and the third network operating in accordance with a second protocol different from the first protocol; and means associated with each local network for routing calls originating on an associated local network over the third network to another means for routing associated with another local network, each means for routing including means for determining from data on an associated local network whether a service call is required and for transmitting over the third network a data message compatible with the second protocol, said data message containing data indicative of the required service and each means for routing including means to read data messages to determine the required service call and to produce a data message on the associated local network according to the first protocol to establish the required call service.

6. A communication method comprising the steps of: receiving a call configured according to a first communications protocol, wherein the call includes a requirement for at least one call service enabled by the first communications protocol; producing at least one data message including data representative of the call service wherein the data message is compatible with a second protocol; transmitting the data message over a communications network operating according to the second protocol; receiving the data message after transmission over the communications network and establishing the required call service represented by the data message with a further communications network, said further communications network operating in accordance with a communications protocol which enables the call service enabled by the first communications protocol.

7. The communication method as claimed in claim 6 further including the steps of: receiving a dialled digit string; including the dialled digit string into the data message wherein the data message is compatible with the second protocol and transmitting the data message over the communications network operating according to the second communications protocol; receiving the data message after transmission over the communications network and transmitting the data message including a dialled digit string to the further communications network.

8. A processor instruction element connected to a processor for instructing the processor to carry out the method as claimed in claim 6.

* * * * *